July 12, 1966    S. J. DI MILLA    3,260,542
HUB SECURING MEANS
Filed Jan. 29, 1964    2 Sheets-Sheet 1
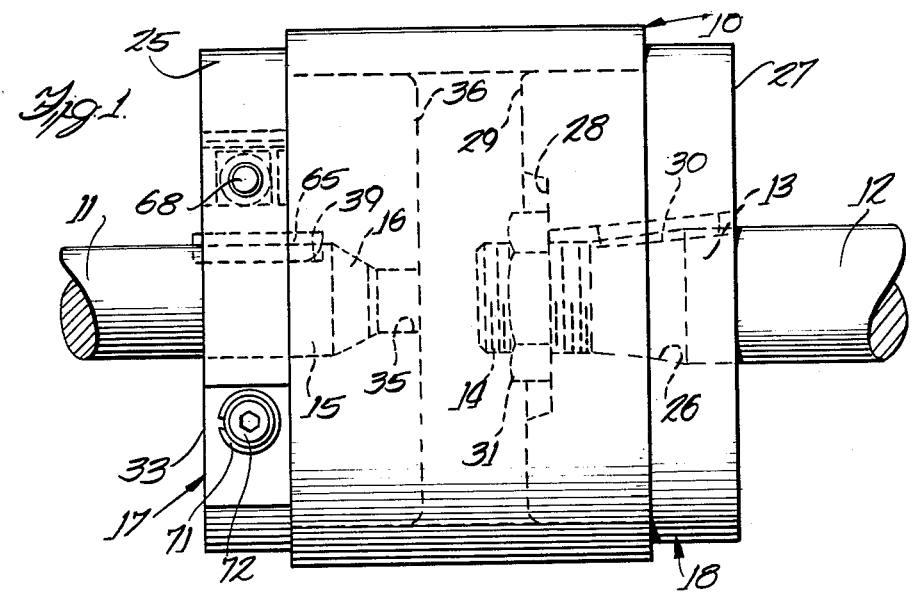
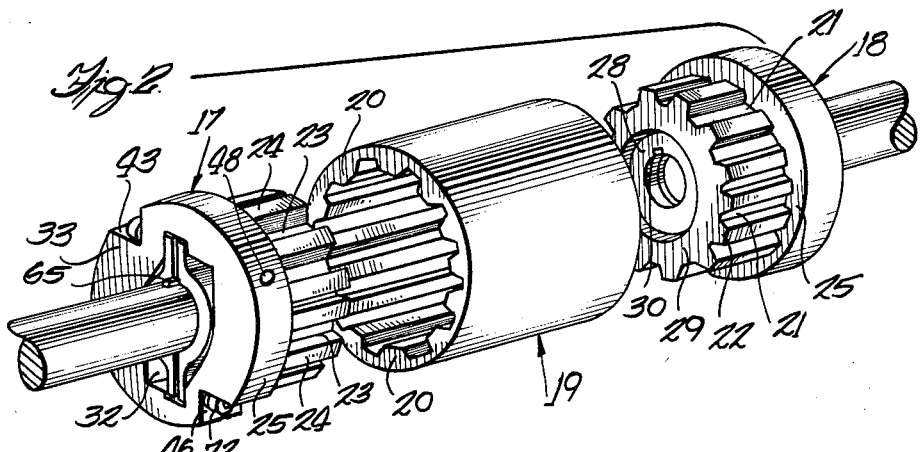
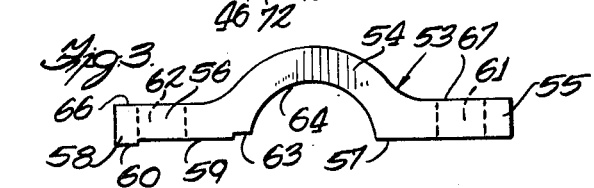
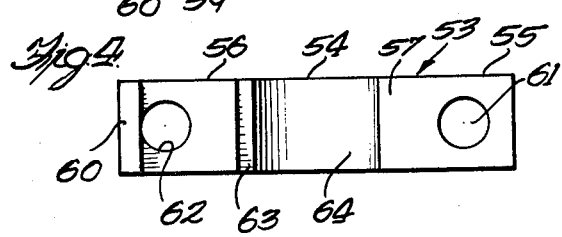
Inventor
Salvatore J. Di Milla
Frederick J. Kubel
Attorney July 12, 1966  S. J. DI MILLA  3,260,542
HUB SECURING MEANS Filed Jan. 29, 1964  2 Sheets-Sheet 2

Inventor
Salvatore J. Di Milla
Frederick J. Kubel
Attorney

United States Patent Office 3,260,542
Patented July 12, 1966

3,260,542
HUB SECURING MEANS
Salvatore J. Di Milla, Fort Wayne, Ind., assignor to International Harvester Company, Chicago, Ill., a corporation of New Jersey
Filed Jan. 29, 1964, Ser. No. 340,881
14 Claims. (Cl. 287—53)

This invention relates to a flexible coupling for drivingly interconnecting a pair of shafts for transmitting power by rotary motion, and more particularly, to a new and improved connecting means for securing a coupling part to one of the power transmitting shafts.

The necessity of providing a silently operating flexible shaft coupling between driving and driven shafts occurs frequently and especially in the motor truck industry where it is oftentimes required to transmit power to an accessory such as an air compressor and/or a vacuum pump from the vehicle engine. Usually the drive shaft is in the form of an engine or auxiliary drive shaft which is drivingly coupled to the air compressor or vacuum pump input shaft. The drive shaft is parallel to but is oftentimes misaligned or offset slightly with respect to the engine auxiliary drive shaft and, therefore, the shaft coupling must be capable of transmitting power between the shafts silently and efficiently even though shaft misalignment exists. One form of resilient shaft coupling that has been frequently used in motor truck installations to satisfy the above noted necessity is that disclosed in U.S. Patent 2,859,599 and briefly comprises a pair of coupling hubs, each of which is connected to a respective shaft and a flexible coupling sleeve or load-carrying band extending between the coupling hubs and provided with internal ribs adapted to mesh with external grooves formed on the coupling hubs. Heretofore, each coupling hub was provided with a central shaft-receiving bore and was drivingly connected to the shaft by means of a conventional Woodruff key and a plurality of circumferentially spaced, radially extending set screws threaded into the coupling hub and engageable with the shaft at a point spaced from the terminal end of the shaft disposed within the shaft-receiving bore.

While to a great extent such resilient shaft couplings have been successful in certain installations, costly failures have occurred because of the high cyclic forces being transmitted through the coupling and/or because the relatively large degree of shaft misalignment existing and the particular manner, as pointed out above, in which the shaft ends were generally drivingly connected to the coupling hub. It has been determined that if the set screws are loose or become loose in operation and afford inadequate clamping action and/or if excessive clearance between the auxiliary drive shaft and the coupling hub bore exist, coupling failures can be expected. The coupling failures can be attributed to the fact that during operation of the shaft coupling, the drive and driven shafts are parallelly offset and since the coupling is transmitting high cyclic forces, relatively large combined forces are transmitted through the coupling with large components. The force components which are produced by virtue of the offset of the drive and driven shafts are applied to the drive coupling hub at points axially spaced from the clamping set screws and since the coupling hub material is usually softer than the drive shaft material, the force moment resulting causes the shaft end to wear into the coupling hub bore. As the wear progresses, the set screws commence digging into the shaft. The wear process is accellerated with increased shaft-to-coupling hub bore clearance. The set screws eventually loosen as the wear process continues until the hub coupling is connected to the shaft only by the Woodruff key and the applied vertical forces will substantially cause the key to wear into the coupling hub and if such wear is continued thereafter, the key will be "battered" and will eventually be sheared off.

It is, therefore, a primary object of the present invention to obviate the above noted shortcomings of prior flexible coupling and to extend the useful life of such flexible couplings beyond that which was heretofore possible by providing a new and improved means for connecting the coupling hub of the flexible coupling to the engine auxiliary drive shaft or other drive shaft.

A further object of the invention is to provide a flexible shaft coupling which is dynamically balanced.

Another object is to incorporate unique piloting means in the coupling hub which piloting means cooperates with the shaft taper provided on the end of the drive shaft if such taper exists and positions and supports the end of the coupling hub remote from the clamping means to thereby eliminate wobble of the coupling hub on the drive shaft end, particularly where limited space is available between shaft ends.

A further object is to provide a coupling which is readily assembled for drivingly connecting a pair of shafts which assembly operation is accomplished with a minimum of effort and without the need of special tools or the like.

Still another object of the present invention is to provide a flexible shaft coupling which is compact, economical to manufacture, and highly efficient in the operation.

The foregoing and other important objects and desirable features inherent in and encompassed by the invention, together with many of the purposes and uses thereof, will become readily apparent from a reading of the ensuing description and in conjunction with the annexed drawings, in which:

FIGURE 1 is a side elevational view of an assembled flexible shaft coupling embodying the invention;

FIGURE 2 is an exploded perspective view illustrating the major components of the shaft coupling in alignment for assembly;

FIGURE 3 is a side elevational view of one of the clamp members;

FIGURE 4 is a bottom plan view of the clamp member illustrated in FIGURE 3;

Figure 5:
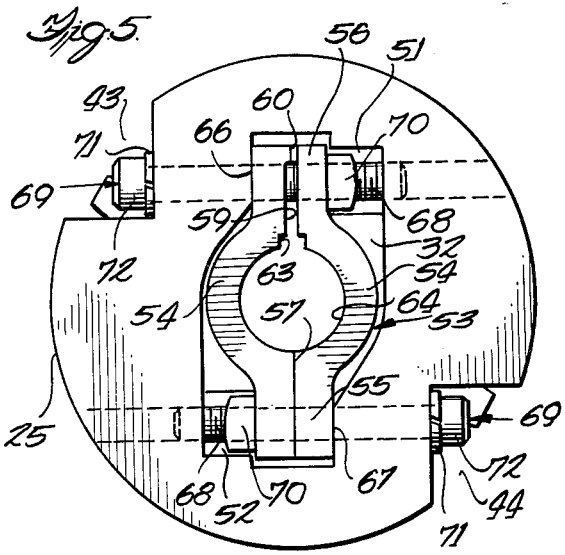
FIGURE 5 is an end elevational view of one of the coupling hubs.
Figure 6:
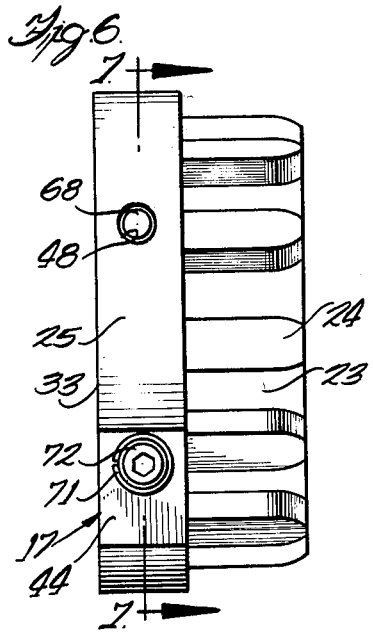
FIGURE 6 is a side elevational view of the coupling hub illustrated in FIGURE 5.

Referring to the drawings in detail, wherein like reference characters represent like elements throughout the various views, a flexible shaft coupling, designated generally by numeral 10 and embodying the invention, is utilized to drivingly connect an engine or motor driven shaft 11 to a driven shaft 12 which shaft 12 may be the input shaft of a motor vehicle accessory such as an air compressor or a vacuum pump or the like (not shown). As best shown in FIGURE 1, the coupling end of the driven or input shaft 12 of the vehicle accessory is constructed in a conventional manner and is formed to provide a tapered section 13 and a terminal reduced diameter threaded portion 14. The tapered section 13 is provided with a conventional, axially extending keyway slot (not shown).

Referring to the coupling end construction of the engine auxiliary or drive shaft 11, it will be noted that the cylindrical end section 15 thereof is provided with a terminal tip portion 16 which is frusto-conically shaped.

The purpose of the annular tapered surface provided by forming tip portion 16 in this manner will be pointed out hereinafter. The cylindrical end section 15 of the shaft 11 is also provided with an axially extending keyway slot.

The assembled resilient shaft coupling 10 of the present invention basically comprises three major components, namely, a pair of spaced hubs 17 and 18 which are operatively interconnected by means of a sleeve 19. The construction of the shaft coupling 19, which per se, forms no part of the present invention, is best illustrated in FIGURE 2. The sleeve 15 which is a generally cylindrical outer contour, is provided with evenly spaced, axially extending ribs or teeth 20 on its inner periphery and is made of flexible material. Preferably, the ribs 20 are made of natural or synthetic rubber or the like. The shaft coupling hub 18 associated with the driven shaft 12 is provided with circumferentially spaced, axially extending grooves 21 on its outer periphery which are separated by axially extending lands 22. The teeth 20 of the shaft coupling sleeve 19 correspond to and are adapted to mesh with the grooves 21 of the hub 18. Similarly, the shaft coupling hub 17 associated with the drive shaft 11 is provided with a plurality of grooves 23 circumferentially separated by axially extending lands 24. The shaft coupling sleeve ribs or teeth 20 are adapted to mesh with the grooves 23 in the same manner that the teeth 20 mesh with the grooves 21 of the hub 18. The hubs are preferably made of relatively rigid material such as steel or the like and are each provided with an annular end flange 25 which extends radially outwardly beyond the lands 22 or 24 associated therewith. Each flange 25 is adapted to abut a respective opposite end of the flexible sleeve 19 when the coupling 10 is in its assembled condition for retaining the sleeve 19 in operative engagement with the hubs 17 and 18. From the foregoing, it will be appreciated that the sleeve ends are adapted to snugly fit over the hubs 17 and 18 and abut the flanges 25 to thereby drivingly interconnect the hubs 17 and 18. The sleeve 19 being somewhat flexible, is capable of yielding without slipping on the hubs 17 and 18 to compensate for any slight misalignment of the oppositely disposed shafts 11 and 12 which may exist without adversely affecting the drive connection between the hubs 17 and 18. The innermost ends of the grooves 21, 23 and lands 22, 24 are chamfered slightly to facilitate telescoping of the sleeve 19 on the hubs 17, 18 during assembly of the shaft coupling 10.

The coupling hub 18, which is illustrated in FIGURES 1 and 2, is provided with a central tapered bore 26 which extends axially therethrough. The large end of the tapered bore 26 opens into the outwardly facing surface 27 of the hub 18 and the smaller end thereof opens into a shallow, circular recess 28 formed in the innermost surface 29 of the hub 18. The hub 18 is also provided with a keyway slot 30 which is coextensive in length with the tapered bore 26. From the foregoing, the manner in which the hub 18 is drivingly connected to the shaft 12 is believed clear. The hub member 18 is telescoped over the tapered section 13 of the driven shaft 12 with a key member (not shown) extending radially into the keyway slot 30 and the keyway slot formed in the tapered section 13 of the driven shaft 12. Thereafter, a lock nut is threaded on the reduced diameter threaded portion 14 of the shaft 12 and is screwed on tightly to firmly wedge the tapered section 13 into engagement with the surface of the hub 18 defined in the tapered bore 26. It will be noted that the diameter of the recess 28 is a size sufficient to accommodate the diameter of the particular lock nut 31 being used.

Referring to the construction of the hub 17, it will be noted that a cavity 32 is formed in the outermost face 33 of the flange 25. The hub 17 is provided with an axially extending bore 34 which has one end opening into the cavity 32 and has a diameter slightly larger than the diameter of the cylindrical end section 15 whereby a slip fit between the cylindrical end section 15 and the bore 34 is provided. The hub 17 is also provided with a relatively short bore 35 of a smaller diameter than and in axial alignment with the bore 34. The bore 35 has one end opening into the innermost end face 36 of the hub 17. The bores 34 and 35 are in communication with each other by means of a tapered bore 37 which is defined by a frusto-conically shaped annular surface 38. Surface 38 provides an end stop for the cylindrical end section 15, and locates the position of the hub 17 on the cylindrical end section 15. The coupling hub 17 has a keyway slot 39 formed therein which extends from the innermost end face 36 to the flat surface 40 serving as the bottom wall of the cavity 32.

Figure 7:
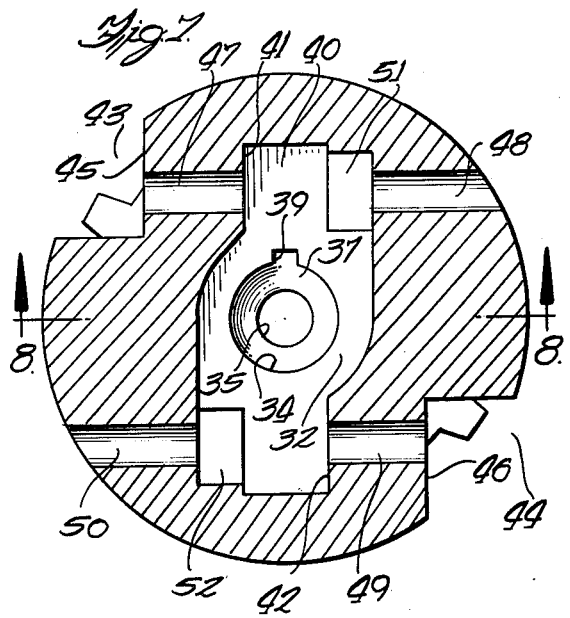
FIGURE 7 is a sectional view taken substantially along lines 7—7 of FIGURE 6.
Figure 8:
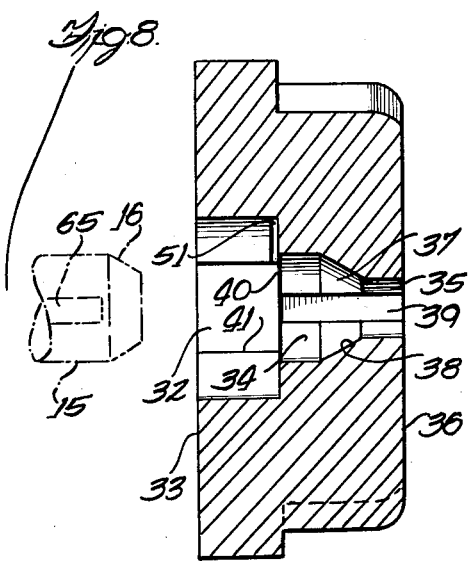
FIGURE 8 is a sectional view taken substantially along line 8—8 of FIGURE 7.

Referring to the construction of the cavity 32 in detail, it will be noted that the side wall thereof is formed to provide a pair of generally rectangular, spaced and parallel abutments 41, 42. The abutments 41, 42 are disposed on diametrically opposite sides of the rotational axis of the coupling hub 17 and each respective abutment 41, 42 lies in a respective plane parallel and spaced from a plane containing rotational axis of the coupling hub 17 and the keyway slot 39. As best illustrated in FIGURE 7, the outer peripheral surface of the flange 25 is provided with a pair of notches 43, 44 which are circumferentially spaced substantially 180 degrees with respect to each other. The notch 43 is partially defined by a surface 45 which is spaced and parallel to the abutment 41 and similarly a surface 46 partially defining the notch 44 is spaced and parallel to the abutment 42. Extending between and having its opposite ends opening into the surface 45 and the abutment 41 is an elongated passageway 47. A passageway 48 in axial alignment with the passageway 47 extends from the cavity 32 to the outer peripheral surface of the flange 25. In a similar manner a passageway 49 extends between and opens into the surface 46 and the abutment 42 and a passage 50, axially aligned with the passageway 49, opens into the cavity 32 in the outer peripheral surface of the flange 25. The bottom surface 40 of the cavity 32 is provided with a pair of slightly raised platforms 51, 52, the purpose of which will be explained hereinafter. The outwardly facing surfaces of the platforms 51, 52 are axially spaced outwardly from the generaly plane containing the bottom surface 40 of the cavity 32. Each platform 51, 52 is disposed adjacent the point where a respective one of said passageways 48, 50 open into the cavity 32.

The clamping means for rigidly, but detachably, connecting the drive shaft 11 to the coupling hub 17 includes a pair of identically constructed clamp members 53. Each clamp member 53 is formed with a generally semi-cylindrical mid-section 54. Each clamp member 53 is also provided with a pair of oppositely extending legs 55, 56. When the coupling means is in its assembled condition, the clamp members 53 are arranged face-to-face with the flat inner faces 57 of the legs 55 in abutting engagement with each other and with the semi-cylindrical mid-sections 54 substantially encircling and engaging the cylindrical end section 15 of the drive shaft 11. Referring to the construction of the leg 56 of the clamp member 53, it will be noted that a tab 58 projects from the general plane of the normally inner surface or face 59 thereof. The flat surface 60 of the tab 58 lies substantially in the same plane as the inner face 57 of the leg 55 and it will, therefore, be appreciated that the surface or face 59 is slightly spaced and parallel to such plane. Each clamp member 53 is also provided with a pair of apertures 61, 62 therethrough, the aperture 61 extending through the leg 55 and the aperture 62 extending through the leg 56 intermediate the tab 58 and the semi-cylindrical mid-section 54. When the clamp members 53 are in their assembled relationship with the coupling hub 17 and the shaft end section 15, the clamp members 53 are disposed within the cavity 32 and the apertures 56 thereof are in axial alignment with the passageways 47 and 48. Likewise the apertures 61 are in axial alignment with the passageways 49 and 50. A notch 63 is provided in each clamp member 53 at the juncture of the leg inner surface 59 and the inner shaft-engaging surface 64. The notches 63 when the clamp members 53 are assembled together form a contractible pocket for accommodating the Woodruff key portion projecting radially from the cylindrical end section 15 of the drive shaft 11 and disposed within the cavity 32.

From the foregoing, it is believed the manner in which the coupling hub 17 is drivingly connected to the drive shaft 11 is clear. The frusto-conically shaped tip portion 16 of the drive shaft 11 is advanced into the cavity 32 and bore 34 until it is seated upon the surface defining the tapered bore 37. It is to be understood a Woodruff key member 65 is disposed within the keyway slot formed in the cylindrical end section 15 of the drive shaft 11. Consequently, a portion of the key member 65 extends radially into the keyway slot 39 formed in the coupling hub 37 when the tip portion 16 abuts the frusto-conically shaped surface 38. It is to be understood that the key member 65 is of a sufficient axial length that a portion thereof is disposed within the cavity 32 and that the portion of the key member 65 disposed within the cavity 32 has an axial length substantially equal to the depth of the cavity 32 measured from the bottom wall 40 to the flat outermost face 33 of the hub 17.

The clamp members 53 have an axial width substantially equal to the depth of a cavity 32 and, consequently, when the clamp members 53 are in their assembled relationship with the hub member 17 no part of the clamping member 53 protrudes axially from the outermost end face 33 of the coupling hub 17. Once the shaft 11 has been advanced sufficiently to cause the tip portion 16 thereof to be firmly seated on the surface defining the tapered bore 37, the clamp members 53 are placed in the cavity 32 with the outermost face 66 of the leg 56 of one of the clamp members 53 abutting the abutment 41 and the outermost surface 67 of the leg 55 of the other clamp member 53 abutting the abutment 42. When arranged in this manner, the semi-circular surfaces 64 of the clamp members 53 loosely engage the cylindrical end section 15 of the drive shaft 11 and a portion of the key member 65 is disposed within the pocket formed by the notches 63. The threaded shank 68 of each of a pair of clamping bolts 69 is inserted into a respective one of the passageways 47, 49 and is caused to extend through either the aligned clamp member apertures 61 or 62. A generally square nut 70 is then threaded on each shank 68 projecting from the clamp members 53. The size of the nuts 70 is such that when one of the flat sides thereof is abutting a respective platform 51, 52, each nut 70 is axial alignable with a respective bolt 69. Consequently, as the bolts 69 are rotated, the nuts 70 are prevented from rotating therewith. Continuous threading of the bolts 69 into the nuts 70 causes the end portions of the shanks 68 to enter the passageways 48 and 50, as shown in FIGURE 5, and a lock washer 71 carried by the shank 68 adjacent the head 72 of each bolt 69 to be compressed into engagement with a respective surface 45, 46. Upon further rotation of the bolt 69 extending through the passageway 49, the inner faces 57 are firmly compressed into engagement with each other and one of the outer faces 67 of the legs 55 is tightly forced into engagement with the abutment 42. As the bolt 69 passing through the passageway 47 is drawn up tightly, the tab surfaces 60 are firmly pressed into engagement with each other and the outer face 66 is forced tightly into compressive engagement with the abutment 41. Inasmuch as the semi-circular surfaces 64 of the clamp members 53 substantially encircle the cylindrical end section 15 of the drive shaft 11 and since the aligned openings 62 are disposed between the tabs 58 and the semi-circular surfaces 64, the clamping force exerted by the bolt 69 extending through the passageway 47 is intermediate the tabs 58 and the semi-circular surfaces 64. Consequently, since the inner surfaces 59 of the legs 56 are slightly spaced with respect to each other, the clamping force exerted by the bolt 69 passing through the passageway 47 tends to cause the inner surfaces of the legs 56 to approach each other. Hence, the inner surfaces 64 are, in effect, radially compressed tightly into frictional gripping engagement with the cylindrical end section 15 of the drive shaft 11 and at the same time the key accommodating pocket is contracted by having the surfaces defining each of the notches 63 approach each to firmly grip the portion of the key member 65 projecting from the cylindrical end section 15 and disposed within the cavity 32 to, in effect, lock the key member 65 to the hub 17.

From the foregoing it will be appreciated that the connecting means for securing the coupling hub 17 to the drive shaft 11 offers many distinct advantages over prior art constructions. By seating the tip portion 16 of the shaft 11 on the surface defining the tapered bore 37, the possibility of the coupling hub 17 wobbling on the shaft 11 during operation of the coupling 10 to transmit power is eliminated. Furthermore, torque is not only transmitted between the drive shaft 11 and the coupling hub 17 by way of the key member 65 directly but also by way of the key member 65 indirectly through the intermediary of the clamp members 53 and the flat abutments 41, 42. It will also be appreciated that since the inner semi-circular surfaces 64 of the clamp members 63 are urged into radial engagement with the cylindrical end section 15 of the drive shaft 11 with a considerable radial force, a relatively high frictional resistance to slipping between the surfaces 64 and the cylindrical end section 15 is developed and hence, torque is capable of being transmitted directly to the clamp members 53 from the drive shaft 11 without first being transmitted through the key member 65. It will also be appreciated that torque is not transmitted through the clamping bolts 69 to possibly adversely affect the clamping action of the bolts.

The embodiment of the invention chosen for the purposes of illustration and description therein is that preferred for achieving the object of the invention and developing the utility thereof in a most desirable manner, due regard being had to existing factors of economy, simplicity of design and construction and the improvements sought to be effected. It will be appreciated therefore that the particular structural and functional aspects emphasized herein are not intended to exclude but rather to suggest such other adaptations and modifications of the invention as fall within the spirit and scope of the invention as defined in the appended claims.

I claim:

1. Means for detachably securing a hub to a power transmitting shaft, the combination including, a shaft; a hub having a central bore for receiving an end of said shaft, said hub having a pair of spaced and parallel flat abutments, each of said abutments being disposed on a respective opposite side of each of a pair of perpendicular planes containing the longitudinal axis of said bore and both abutments being parallel to one of said planes; and means for connecting said hub to said shaft including a pair of separable clamp members arranged face-to-face, each clamp member including a semi-cylindrical mid-section having a semi-circular shaft engaging surface partially embracing said shaft and pair of legs integrally formed with and extending in opposite directions from said semi-cylindrical section, a first leg of each of said clamp members being adjacent to each other and a respective one of said abutments, a second leg of each of said clamp members being adjacent to each and the other of said abutments, spacer means at the free ends of said second legs for separating the inwardly facing surfaces of said second legs, and compression means for clamping the inwardly facing surfaces of said first legs into abutting engagement with each other and the outwardly facing surface of one of said first legs into abutting engagement with the adjacent abutment, and for forcing said inwardly facing surfaces of said second legs toward each other and the outwardly facing surface of one of said second legs into abutting engagement with the abutment adjacent thereto whereby said clamp member shaft-engaging surfaces are caused to firmly grip said shaft.

2. Means for detachably securing a hub to a power transmitting shaft as set forth in claim 1, wherein said compression means includes a pair of clamping bolts, one of said bolts extending through said pair of first legs and the abutment adjacent thereto, and the other of said bolts extending through said pair of second legs and the abutment adjacent thereto, the longitudinal axes of said bolts being substantially normal to the planes containing said abutments and the longitudinal axis of said bolt extending through said second pair of second legs being spaced intermediate said spacer means and said semi-cylindrical mid-sections.

3. Means for detachably securing a hub to a power transmitting shaft, the combination including, a shaft; a hub having a central bore for receiving an end of said shaft, said hub having a pair of spaced and parallel flat abutments, each of said abutments being disposed on a respective opposite side of each of a pair of perpendicular planes containing the longitudinal axis of said bore and both abutments being parallel to one of said planes; and means for connecting said hub to said shaft including a pair of separable clamp members arranged face-to-face, each clamp member including a semi-cylindrical mid-section having a semi-circular shaft-engaging surface partially embracing said shaft and a pair of legs integrally formed with and extending in opposite directions from said semi-cylindrical section, a first leg of each of said clamp members being adjacent to each other and a respective abutment, a second leg of each of said clamp members being adjacent to each other and the other of said abutments, the inwardly facing surface of each of said second legs having a raised tab at the free end thereof, said tabs projecting toward each other and compression means for clamping the inwardly facing surfaces of said first legs into abutting engagement with each other and the outwardly facing surface of one of said first legs into abutting engagement with the adjacent abutment, and for clamping said tabs into abutting engagement with each other and the outwardly facing surface of one of said second legs into abutting engagement with the abutment adjacent thereto whereby said shaft is caused to be firmly gripped by said clamp member shaft-engaging surfaces.

4. Means for detachably securing a hub to a power transmitting shaft as set forth in claim 3, wherein said compression means includes a pair of clamping bolts, one of said bolts extending through said pair of first legs and the abutment adjacent thereto, and the other of said bolts extending through said pair of second legs and the abutment adjacent thereto, the longitudinal axes of said bolts being substantially normal to the planes containing said abutments and the longitudinal axis of said bolt extending through said pair of second legs being spaced intermediate said tabs and said semi-cylindrical mid-sections.

5. Means for detachably securing a hub to a power transmitting shaft, the combination including, a shaft having a tapered tip portion; a hub having a central bore for receiving an end of said shaft, said hub having a tapered bore at one end of said central bore defined by a frusto-conical surface complementary to and for seating said tapered tip portion thereon, said hub further having a pair of spaced and parallel flat abutments, each of said abutments being disposed on a respective opposite side of each of a pair of perpendicular planes containing the longitudinal axis of said bore and both abutments being parallel to one of said planes; and means for connecting said hub to said shaft including a pair of separable clamp members arranged face-to-face, each clamp member including a semi-cylindrical mid-section having a semi-circular shaft-engaging surface partially embracing said shaft and a pair of legs integrally formed with and extending in opposite directions from said semi-cylindrical section, a first leg of each of said clamp members being adjacent to each other and a respective abutment, the second leg of each of said clamp members being adjacent to each other and the other of said abutments, the inwardly facing surface of each of said second legs having a raised tab at the free end thereof, said tabs projecting toward each other, and compression means for clamping the inwardly facing surfaces of said first legs into abutting engagement with each other and the outwardly facing surface of one of said first legs into abutting engagement with the adjacent abutment, and for clamping said tabs into abutting engagement with each other and the outwardly facing surface of one of said second legs into abutting engagement with the adjacent abutment whereby said clamp member shaft-engaging surfaces are caused to firmly grip said shaft.

6. Means for detachably securing a hub to a power transmitting shaft as set forth in claim 5, wherein said compression means includes a pair of clamping bolts, one of said bolts extending through said pair of first legs and the abutment adjacent thereto, and the other of said bolts extending through said pair of second legs and the abutment adjacent thereto, the longitudinal axes of said bolts being substantially normal to the planes containing said abutments and the longitudinal axis of said bolt extending through said pair of second legs being spaced intermediate said tabs and said semi-cylindrical mid-sections.

7. Means for detachably securing a hub to a power transmitting shaft, the combination including, a shaft having a tapered tip portion; a hub having a cavity provided in one end face thereof and a central bore extending axially from said cavity for receiving an end of said shaft, said hub further having a tapered bore at the end of said central bore opposite said cavity defined by a frusto-conical surface complementary to and for seating said tapered tip portion thereon, said cavity being partially defined by a pair of spaced and parallel flat abutments, each of said abutments being disposed on a respective opposite side of each of a pair of perpendicular planes containing the longitudinal axis of said central bore and both abutments being parallel to one of said planes; and means for connecting said hub to said shaft including a pair of separable clamp members disposed within said cavity and arranged face-to-face, each clamp member including a semi-cylindrical mid-section having a semi-circular shaft-engaging surface partially embracing said shaft and a pair of legs integrally formed with and extending in opposite directions from said semi-cylindrical section, a first leg of each of said clamp members being adjacent to each other and a respective abutment, a second leg of each of said clamp members being adjacent to each other and the other of said abutments, the inwardly facing surface of each of said second legs having a raised tab at the free end thereof, said tabs projecting toward each other, and compression means for clamping the inwardly facing surfaces of said first legs into abutting engagement with each other and the outwardly facing surface of one of said first legs into abutting engagement with the adjacent abutment, and for clamping said tabs into abutting engagement with each other and the outwardly facing surface of one of said second legs into abutting engagement with the adjacent abutment whereby said clamp member shaft-engaging surfaces are caused to firmly grip said shaft.

8. Means for detachably securing a hub to a power transmitting shaft as set forth in claim 7, wherein said compression means includes a pair of clamping bolts, one of said bolts extending through said pair of first legs and the abutment adjacent thereto, and the other of said bolts extending through said pair of second legs and the abutment adjacent thereto, the longitudinal axes of said bolts being substantially normal to the planes containing said abutments and the longitudinal axis of said bolt extending through said pair of second legs being spaced intermediate said tabs and said semi-cylindrical mid-sections.

9. Means for detachably securing a hub to a power transmitting shaft, the combination including, a shaft having an axially extending, longitudinal keyway slot formed therein; a hub having a central bore for receiving said shaft, the surface defining said central bore having an axially extending hub keyway slot formed therein radially aligned with said shaft keyway slot but of a shorter axial length, said hub further having a pair of spaced and paralled flat abutments, each of said abutments being disposed on a respective opposite side of each of a pair of perpendicular planes containing the longitudinal axis of said bore and both abutments being parallel to one of said planes; and means for connecting said hub to said shaft including a key member having an axial length longer than said hub keyway slot and having portions in both of said keyway slots and a portion projecting radially from said shaft and disposed without said hub keyway slot, said means for connecting said hub to said shaft further including a pair of separable clamp members arranged face-to-face, each clamp member including a semi-cylindrical mid-section having a generally semi-circular shaft-engaging surface partially embracing said shaft and a pair of legs integrally formed with and extending in opposite directions from said semi-cylindrical section, a first leg of each of said clamp members being adjacent to each other and a respective abutment, a second leg of each of said clamp members being adjacent to each other and the other of said abutments, the inwardly facing surface of each of said second legs having a raised tab at the free end thereof, said tabs projecting toward each other, each of said clamp members further having a notch formed therein adjacent the juncture of the shaft-engaging suface and the inwardly facing surface of the second leg thereof, the surfaces of said notches defining an axially extending, contractible pocket for receiving said portion of said key member projecting radially from said shaft and disposed without said hub keyway slot, and compression means for clamping the inwardly facing surfaces of said first legs into abutting engagement with each other and the outwardly facing surface of one of said first legs into abutting engagement with the adjacent abutment, and for clamping said tabs into abutting engagement with each other and the outwardly facing surface of one of said second legs into abutting engagement with the adjacent abutment whereby said clamp member shaft-engaging surfaces are caused to firmly grip said shaft and said pocket is contracted by moving the surfaces of each of said notches toward the surfaces of the other notch to firmly grip said key member portion received therein.

10. Means for detachably securing a hub to a power transmitting shaft, the combination including, a shaft; a hub having a cavity provided in one end space thereof and a central bore etxending axially from said cavity for receiving an end of said shaft, said cavity being partially defined by a pair of spaced and parallel flat abutments, each of said abutments being disposed on a respective opposite side of each pair of perpendicular planes containing the longitudinal axis of said central bore and both abutments being parallel to one of said planes; and means for connecting said hub to said shaft including a pair of separable clamp members disposed within said cavity and arranged face-to-face, each clamp member including a semi-cylindrical mid-section having a semi-circular shaft-engaging surface partially embracing said shaft and a pair of legs integrally formed with and extending in opposite directions from said semi-cylindrical section, a first leg of each of said clamp members being adjacent to each other and a respective one of said abutments, a second leg of each of said clamp members being adjacent to each other and the other of said abutments, the inwardly facing surface of each of said second legs having a raised tab at the free end thereof, said tabs projecting toward each other, and compression means for clamping the inwardly facing surfaces of said first legs into abutting engagement with each other and the outwardly facing surface of one of said first legs into abutting engagement with the adjacent abutment, and for clamping said tabs into abutting engagement with each other and outwardly facing surface of one of said second legs into abutting engagement with the adjacent abutment whereby said clamp member shaft-engaging surfaces are caused to firmly grip said shaft.

11. Means for detachably securing a hub to a power transmitting shaft, the combination including, a shaft having a tapered tip portion and a longitudinal keyway slot extending axially away from said tapered tip portion; a hub having a central bore for receiving an end of said shaft, said hub having a tapered bore at one end of said central bore defined by a frusto-conical surface complementary to and for seating said tapered tip portion thereon, the surface defining said central bore having an axially extending hub keyway slot formed therein radially aligned with said shaft keyway slot but of a shorter axial length, said hub further having a pair of spaced and parallel flat abutments, each of said abutments being disposed on a respective opposite side of each of a pair of perpendicular planes containing the longitudinal axis of said bore and both abutments being parallel to one of said planes; and means for connecting said hub to said shaft including a key member having an axial length longer than said hub keyway slot and having portions in both of said keyway slots and a portion projecting radially from said shaft and disposed without said hub keyway slot, said means for connecting said hub to said shaft further including a pair of separable clamp members arranged face-to-face, each clamp member including a semi-cylindrical mid-section having a generally circular shaft-engaging surface partially embracing said shaft, and a pair of legs integrally formed with and extending in opposite directions from said semi-cylindrical section, a first leg of each of said clamp members being adjacent to each other and a respective one of said abutments, a second leg of each of said clamp members being adjacent to each other and the other of said abutments, the inwardly facing surface of each of said second legs having a raised tab at the free end thereof, said tabs projecting toward each other, each of said clamp members further having a notch formed therein adjacent the juncture of the shaft-engaging surface and the inwardly facing surface of the second leg thereof, the surfaces of said notches defining an axially extending, contractible pocket for receiving said portion of said key member projecting radially from said shaft and disposed without said hub keyway slot, and compression means for clamping the inwardly facing surfaces of said first legs into abutting engagement with each other and the outwardly facing surface of one of said first legs into abutting engagement with the adjacent abutment, and for clamping said tabs into abutting engagement with each other and the outwardly facing surface of one of said second legs into abutting engagement with the adjacent abutment whereby said clamp member shaft-engaging surfaces are caused to firmly grip said shaft and said pocket is contracted by moving the surfaces defining said notches toward each other to firmly grip said key member portion received therein.

12. Means for detachably securing a hub to a power transmitting shaft, the combination including, a shaft having an axially extending, longitudinal keyway slot formed therein; a hub having a cavity provided in one end face thereof and a central bore extending axially from said cavity for receiving an end of said shaft, the surface defining said central bore having an axially extending hub keyway slot formed therein radially aligned with said shaft keyway slot but of a shorter axial length, said cavity being partially defined by a pair of spaced and parallel flat abutments, each of said abutments being disposed on respective opposite sides of each of a pair of perpendicular planes containing the longitudinal axis of said central bore and both abutments being parallel to one of said planes; and means for connecting said hub to said shaft including a key member having an axial length longer than said hub keyway slot and having portions in both of said keyway slots and a portion projecting radially from said shaft and disposed within said cavity, said means for connecting said hub to said shaft further including a pair of separable clamp members disposed within said cavity and arranged face-to-face, each clamp member including a semi-cylindrical mid-section and a generally semi-circular shaft-engaging surface partially embracing said shaft and a pair of legs integrally formed with and extending in opposite directions from said semi-cylindrical section, a first leg of each of said clamp members being adjacent to each other and a respective abutment, a second leg of each of said clamp members being adjacent to each other and the other of said abutments, the inwardly facing surface of each of said second legs having a raised tab at the free end thereof, said tabs projecting toward each other, each of said clamp members having a notch formed therein adjacent the juncture of the shaft-engaging surface and the inwardly facing surface of the second leg thereof, the surfaces of said notches defining an axially extending, contractible pocket for receiving said portion of said key member projecting radially from said shaft and disposed within said cavity, and compression means for clamping the inwardly facing surfaces of said first legs into abutting engagement with each other and the outwardly facing surface of one of said first legs into abutting engagement with the adjacent abutment, and for clamping said tabs into abutting engagement with each other and the outwardly facing surface of one of said second legs into abutting engagement with the adjacent abutment whereby said clamp member shaft-engaging surfaces are caused to firmly grip said shaft and said pocket is contracted by moving the surfaces of each of said notches toward the surfaces of the other notch to firmly grip said key member portion received therein.

13. Means for detachably securing a coupling hub of a flexible coupling to a power transmitting shaft, the combination including, a shaft having a tapered tip portion and a longitudinal keyway slot extending axially away from said tapered tip portion; a hub having a cavity provided in one end face thereof and a central bore extending axially from said cavity for receiving an end of said shaft, said hub further having a tapered bore at the end of said central bore opposite said cavity defined by a frusto-conical surface complementary to and for seating said tapered tip portion thereon, the surface defining said central bore having an axially extending hub keyway slot formed therein radially aligned with said shaft keyway slot but of a shorter axial length, said cavity being partially defined by a pair of spaced and parallel flat abutments, each of said abutments being disposed on a respective opposite side of each of a pair of perpendicular planes containing the longitudinal axis of said central bore and both abutments being parallel to one of said planes; and means for connecting said hub to said shaft including a key member having an axial length longer than said hub keyway slot and having portions in both of said keyway slots and a portion projecting radially from said shaft and disposed within said cavity, said means for connecting said hub to said shaft further including a pair of separable clamp members disposed within said cavity and arranged face-to-face, each clamp member including a semi-cylindrical mid-section having a semi-circular shaft-engaging surface partially embracing said shaft and a pair of legs integrally formed with and extending in opposite directions from said semi-cylindrical section, the first leg of each of said clamp members being adjacent to each other and a respective abutment, a second leg of each of said clamp members being adjacent to each other and the other of said abutments, the inwardly facing surface of each of said second legs having a raised tab at the free end thereof, said tabs projecting toward each other, and each of said clamp members further having a notch formed therein adjacent the juncture of the shaft-engaging surface and the inwardly facing surface of the second leg thereof, the surfaces of said notches defining an axially extending contractible pocket for receiving said portion of said key member projecting radially from said shaft and disposed within said cavity, and compression means for clamping the inwardly facing surfaces of said first legs into abutting engagement with each other and the outwardly facing surface of one of said first legs into abutting engagement with the adjacent abutment, and for clamping said tabs into abutting engagement with each other and the outwardly facing surface of one of said second legs into abutting engagement with the adjacent abutment whereby said clamp member shaft-engaging surfaces are caused to firmly grip said shaft and said pocket is contracted by moving the surfaces of each of said notches toward the surfaces of the other notch to firmly grip said key member portion received therein.

14. Means for detachably securing a coupling hub of a flexible coupling to a power transmitting shaft as set forth in claim 13, wherein said compression means includes a pair of clamping bolts, one of said bolts extending through said pair of first legs and the abutment adjacent thereto, and the other of said bolts extending through said pair of second legs and the abutment adjacent thereto, the longitudinal axes of said bolts being substantially normal of the planes containing said abutments and the longitudinal axis of said bolt extending through said pair of second legs being spaced intermediate said tabs and said semi-cylindrical mid-sections.

References Cited by the Examiner

UNITED STATES PATENTS

| | | | |
|---|---|---|---|
| 378,260 | 2/1888 | McDermott | 287—52.03 |
| 2,067,839 | 1/1937 | Godfrey | 287—52 XR |

OTHER REFERENCES

Bosch: German application 1,106,123, printed May 4, 1961 (KL 47 b 13).

CARL W. TOMLIN, *Primary Examiner.*

A. V. KUNDRAT, *Assistant Examiner.*